US009905070B2

(12) United States Patent
Hecht et al.

(10) Patent No.: US 9,905,070 B2
(45) Date of Patent: Feb. 27, 2018

(54) METHOD FOR PROVIDING MEASUREMENT DATA TO AN APPARATUS FOR PROCESSING VALUABLE DOCUMENTS AND VALUABLE DOCUMENT PROCESSING APPARATUS

(71) Applicant: GIESECKE & DEVRIENT GMBH, Munich (DE)

(72) Inventors: Matthias Hecht, Neubiberg (DE); Klaus Vrana, Neufahrn (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 21 days.

(21) Appl. No.: 14/899,307

(22) PCT Filed: Jun. 26, 2014

(86) PCT No.: PCT/EP2014/001728
§ 371 (c)(1),
(2) Date: Dec. 17, 2015

(87) PCT Pub. No.: WO2014/206559
PCT Pub. Date: Dec. 31, 2014

(65) Prior Publication Data

US 2016/0155283 A1 Jun. 2, 2016

(30) Foreign Application Priority Data

Jun. 27, 2013 (DE) ........................ 10 2013 010 741

(51) Int. Cl.
*G06K 9/00* (2006.01)
*G07D 7/20* (2016.01)
(Continued)

(52) U.S. Cl.
CPC ........... *G07D 7/2058* (2013.01); *B65H 43/04* (2013.01); *B65H 43/08* (2013.01); *G07D 7/08* (2013.01);
(Continued)

(58) Field of Classification Search
CPC .... B65H 43/04; B65H 43/08; G07D 11/0051; G07D 7/08; G07D 7/12; G07D 7/2058; G07D 7/2083
See application file for complete search history.

(56) References Cited

U.S. PATENT DOCUMENTS

| | | |
|---|---|---|
| 6,012,565 A | 1/2000 | Mazur |
| 6,305,550 B1 | 10/2001 | Berz |

(Continued)

FOREIGN PATENT DOCUMENTS

| | | |
|---|---|---|
| DE | 19646454 A1 | 5/1998 |
| DE | 10231409 A1 | 1/2004 |

(Continued)

OTHER PUBLICATIONS

German Search Report for corresponding German Application No. 10 2013 010 741.5, dated Feb. 10, 2014.

(Continued)

*Primary Examiner* — Amara Abdi
(74) *Attorney, Agent, or Firm* — Justin Cassell; Workman Nydegger

(57) ABSTRACT

A method for supplying measuring data of a value-document processing apparatus for processing value documents of stipulated different processing types, has a sensor device, a control device, and a display device. Data sets are read, which respectively contain, for at least two of the processing types, processing-type data by means of which the processing types can be distinguished and the number of the value documents of the respective processing type that are to be
(Continued)

fed to the value-document processing apparatus, and display data for actuating the display device are so established from the data sets that, upon actuation with the display data, the display device displays the processing types and the numbers of the value documents. The display device is actuated with the display data, and measuring data are respectively captured by means of the sensor device in accordance with the displayed processing types.

23 Claims, 5 Drawing Sheets

(51) Int. Cl.

| | |
|---|---|
| ***G07D 11/00*** | (2006.01) |
| ***B65H 43/04*** | (2006.01) |
| ***B65H 43/08*** | (2006.01) |
| ***G07D 7/08*** | (2006.01) |
| ***G07D 7/12*** | (2016.01) |
| ***G07D 7/206*** | (2016.01) |

(52) U.S. Cl.

CPC ............... *G07D 7/12* (2013.01); *G07D 7/206* (2017.05); *G07D 7/2083* (2013.01); *G07D 11/0051* (2013.01)

(56) References Cited

U.S. PATENT DOCUMENTS

| | | | | |
|---|---|---|---|---|
| 6,811,016 | B2 | 11/2004 | Blair | |
| 7,377,423 | B2 * | 5/2008 | Demmeler | G06Q 20/042 235/379 |
| 7,789,243 | B2 | 9/2010 | Hornung et al. | |
| 8,077,961 | B2 * | 12/2011 | Schmalz | G07D 7/20 382/135 |
| 8,381,917 | B2 * | 2/2013 | Schmidt | G07D 7/181 194/206 |
| 2002/0015145 | A1 * | 2/2002 | Numata | G07D 7/121 356/71 |
| 2002/0131630 | A1 * | 9/2002 | Jones | G06K 9/033 382/137 |
| 2004/0084277 | A1 | 5/2004 | Blair | |
| 2006/0011447 | A1 | 1/2006 | Hornung et al. | |
| 2008/0041690 | A1 | 2/2008 | Ito | |
| 2013/0311477 | A1 | 11/2013 | Hecht et al. | |
| 2014/0348413 | A1 * | 11/2014 | Hecht | G07D 11/0084 382/135 |

FOREIGN PATENT DOCUMENTS

| | | | | |
|---|---|---|---|---|
| DE | 10393676 | T5 | 6/2006 | |
| DE | 102005008747 | A1 | 8/2006 | |
| DE | 102005009332 | A1 | 9/2006 | |
| DE | 102010055974 | A1 | 6/2012 | |
| DE | 102011121877 | A1 | 6/2013 | |
| EP | 2226768 | * | 9/2010 | G07D 1/02 |
| EP | 2226768 | A1 | 9/2010 | |
| WO | 2012098393 | A1 | 7/2012 | |

OTHER PUBLICATIONS

International Search Report for corresponding International PCT Application No. PCT/EP2014/001728, dated Sep. 19, 2014.

* cited by examiner

METHOD FOR PROVIDING MEASUREMENT DATA TO AN APPARATUS FOR PROCESSING VALUABLE DOCUMENTS AND VALUABLE DOCUMENT PROCESSING APPARATUS

BACKGROUND

The present invention concerns a method for supplying measuring data of an apparatus for processing value documents of stipulated different processing types, and means for carrying out the method. Preferably, the supplied measuring data can be employable for adapting parameters of the apparatus.

Value documents are understood here to be sheet-shaped objects that represent for example a monetary value and hence should not be manufacturable arbitrarily by unauthorized persons. They hence have features that are not simple to manufacture, in particular to copy, whose presence is an indication of authenticity, i.e. manufacture by an authorized body. Important examples of such value documents are coupons, checks and in particular bank notes.

Value-document processing apparatuses, in particular bank-note processing apparatuses, classify value documents, in particular bank notes, with regard to the value-document type, in the case of bank notes the currency and/or the value, and/or the authenticity and/or the quality and/or the orientation. The orientation of a value document, assuming a rectangular value document, will hereinafter be understood to be one of the four possible positions that can be obtained by respectively rotating the value document around its longitudinal and transverse axes by 180°. The quality of a value document is understood to be in particular its condition; in the case of bank notes the condition can be given in particular by an association with classes such as “fit for circulation” and/or “unfit for circulation” and/or “damaged” or “damaged” in connection with the kind of damage. In dependence on the classification, the value documents can then for example be sorted and, where applicable, deposited in corresponding output regions. This will be explained by the example of value documents in the form of bank notes.

The classification is effected on the basis of different physical properties of the individual, i.e. respectively processed, bank note. Examples of such physical properties are optical properties, in particular color properties, magnetic properties or ultrasonic properties.

Upon the processing of bank notes in bank-note processing apparatuses, measuring data which are employed for the classification are generated by means of sensors on the basis of different physical properties of the individual bank note, i.e. the bank note that is respectively processed or to be processed. The measuring data of a respective sensor describe the physical property or properties captured by the respective sensor. Measuring data will hereinafter be understood in general to be in particular raw data formed by a sensor, which are unprocessed apart from some processing operations in the sensor and/or corrections, in particular also with regard to calibration, removal of noise components or background components.

The measuring data delivered by the sensors are evaluated in a connected evaluation device, which can also be configured as a control and evaluation device. Upon said evaluation, bank-note features characterizing the bank-note type, the authenticity and the quality of the bank note are determined by suitable evaluation methods. In dependence on the determined bank-note features there is then computed by the evaluation device a classification result which consequently determines which output pocket of the bank-note processing apparatus the bank note is to be deposited in. When the evaluation device is configured as a control and evaluation device, the latter can actuate a transport device of the bank-note processing apparatus in dependence on the classification result.

The evaluation methods and the establishment of the classification result must be adapted to the type of the bank notes to be processed and also to the demands of the operators of bank-note processing apparatuses. For this purpose, the evaluation device, preferably at least one evaluation program running therein, is parameterizable, i.e. there are classification parameters present whose values can be stipulated and which are employed upon the evaluation and classification or the establishment of the classification result; said adapting of the classification parameter values, also designated as adapting of the classification parameters, will hereinafter be designated as adaptation.

To establish appropriate classification parameters, the measuring data of corresponding, suitably stipulated bank notes are frequently employed for adapting the classification parameters. More precisely, corresponding measuring data are captured and stored with the bank-note processing apparatus for the stipulated bank notes upon a measuring-data acquisition in a first step. Said measuring data are then utilized for establishing the classification parameter values in a second step.

To enable good parameterization, the measuring-data acquisition frequently involves capturing measuring data for bank notes that differ in various processing properties, for example their type, in particular currency and/or value, their quality or condition, their authenticity and/or the orientation in which they are transported past the sensors in the value-document processing apparatus.

For the subsequent establishment of parameters it is then necessary that the measuring data for the various processing properties can be accessed in a targeted manner. The measuring data must thus be stored in accordingly different data structures, e.g. files. Moreover, the information about which bank note the measuring data were established for must additionally be available.

SUMMARY

The present invention is based on the object of stating a method for supplying measuring data of a value-document processing apparatus for processing value documents of stipulated different processing types, and of providing means for carrying out the method. Preferably, the measuring data are employable for adapting parameters of the value-document processing device.

This object is achieved by a method for supplying measuring data of a value-document processing apparatus for processing value documents of stipulated different processing types, which has a sensor device for capturing at least one property of value documents transported in the value-document processing apparatus, a control device connected to the sensor device, and a display device actuated by the control device; in the method, data sets are read which respectively contain, for at least two of the processing types, processing-type data by means of which the processing types can be distinguished and the number of the value documents of the respective processing type that are to be fed to the value-document processing apparatus. From the data sets, display data for actuating the display device are so established that, upon actuation with the display data, the display device displays the processing types and the numbers of the value documents of the respective processing type that are to be fed, and the display device is actuated with the display data. In accordance with the displayed processing types, measuring data are respectively captured by means of the sensor device for a number of value documents fed to the value-document processing apparatus corresponding to the respective number, and the measuring data are stored. Preferably, the measuring data are suitable for adapting classification parameters for classification methods, particularly preferably of the value-document processing apparatus.

The object is further achieved by an apparatus for processing value documents having a feeding device for value documents to be processed into which value documents are introducible and out of which they are outputable in singled form, an output device in which processed value documents are depositable, a sensor device for capturing at least one property of value documents, a transport device for transporting value documents in singled form from the feeding device to the sensor device and from the sensor device to the output device, a display device for displaying operator-control data, and a control device connected via signal connections to the sensor device, the transport device and the display device. The control device is configured for carrying out the method according to the invention. In particular, it is configured for reading data sets which respectively contain, for each of the processing types, processing-type data by means of which the processing types can be distinguished and the number of the value documents of the respective processing type that are to be fed to the value-document processing apparatus, so establishing display data from the data sets that, upon actuation with the display data, the display device displays the processing types and the numbers of the value documents of the respective processing type that are to be fed, actuating the display device with the actuating data, and respectively capturing measuring data by means of the sensor device in accordance with the displayed processing types for a number of value documents fed to the value-document processing apparatus corresponding to the respective number, and preferably storing the measuring data.

The value-document processing apparatus contains the sensor device which can capture at least one physical property of a value document. It can have for this purpose one or a plurality of sensors. When only one sensor is present, the latter is configured for capturing the at least one physical property. When a plurality of physical properties are captured, there can also be employed a plurality of sensors which respectively capture at least one of the plurality of physical properties. Examples of the properties of a value document are its remission and/or transmission properties in the visible region of the electromagnetic spectrum, in particular also resolved as a function of wavelength or color, the remission and/or transmission properties in the infrared and/or ultraviolet spectral region of the electromagnetic spectrum, luminescence properties, magnetic properties, or remission or transmission properties for ultrasound in stipulated frequency ranges, as well as properties derived therefrom. Accordingly, the sensor device can have at least one optical sensor, in particular a color sensor and/or an IR sensor and/or a UV sensor, a luminescence sensor and/or a magnetic sensor and/or an ultrasonic sensor. Upon capture, the sensor device or its sensor or sensors form sensor signals from which the measuring data can be obtained or which represent the measuring data. For evaluation of the sensor signals or the measuring data, the apparatus comprises an evaluation device, which can be integrated partly or completely into the sensor device or the sensor or sensors. However, it can also be separate from the sensor device. It can also, in particular in the latter case, be integrated at least partly with the control device to form a control and evaluation device.

The control device is configured for controlling the apparatus and is connected for this purpose to the evaluation device and at least the transport device via signal connections. Further, it actuates the display device to which it is connected via a corresponding signal connection and on which information for operator control of the apparatus and/or operating data upon operation can be displayable. The display device may be a normal display device, for example a liquid-crystal display, or also an integrated input and output device, in particular a display device also acting as an input device, preferably a touch-sensitive display ("touch screen").

The apparatus is configured for processing value documents of stipulated processing types. The processing types can be at least partly given in particular by the value-document types and the orientation of the value documents. In the case of bank notes, the value-document type can be given in particular by the currency, the denomination or value and, where applicable, the emission or issue of the value documents. The processing type can then be given by processing features such as the value-document type of the value documents, the orientation of the value documents, and, depending on the embodiment, the authenticity of the value documents and/or the quality of the value documents, where applicable. The processing types are described by processing-type data which are so chosen that they enable the processing types to be mutually distinguished.

Preferably, the processing-type data enable a distinction according to value-document type, in the case of bank notes preferably currency and/or value, and/or quality and/or authenticity and/or orientation of the value documents in a transport path of the value-document processing apparatus or a, or the, feeding device of the value-document processing apparatus for value documents to be processed into which value documents are introducible and out of which they are outputable in singled form.

In the method, data sets are read which allow to establish, or preferably which state, value documents of which processing type are to be fed in which number. In so doing, it is assumed that the value documents specified by a data set are fed to the sensor device in immediate succession.

The data sets containing the processing-type data can be read from different sources.

According to one embodiment, the data sets can be stored in a memory of the value-document processing device and be read from the memory. In the value-document processing apparatus, there can be provided for this purpose a memory device in which the data sets are stored, or the control device can have a memory device for storing the data sets in which the data sets are stored.

Alternatively or additionally, the data sets can be read by means of a data interface of the value-document processing apparatus. Here, the value-document processing apparatus can preferably further have a data interface which, for transferring data to the control device, is connected to the latter; the control device can be configured for reading the data sets by means of the data interface. The data interface can comprise in particular at least one wire-based, optical or wireless interface device, for example at least one network card, or at least one reading device for external storage media, for example, a USB, FireWire, Thunderbolt or other interface device, for example a memory card reader. This embodiment offers the advantage that data sets can be stipulated, adapted to the purpose of the apparatus.

In dependence on the data sets, display data which serve for actuating the display device are then established, for example by the control device.

For the read data sets, display data are respectively so established by the control device that, upon actuation by the display data, the display device displays the processing types and the numbers of the value documents of the respective processing type that are to be fed.

The portions of the method after the reading of the data sets can be carried out in different ways.

Thus, according to one variant, it is possible that the display data are jointly so established for all data sets that, upon the actuation with the display data, the display device displays the processing types and the numbers for the respective processing types in a stipulated order, preferably the order in which the data sets were read, in only one view. A user can then feed the value documents of the stipulated processing types in the respectively required numbers and the required number, preferably separated by a separation card. For the fed value documents the measuring data are then captured and stored.

When it is necessary to capture measuring data for a relatively great number of value documents, however, the following variant is preferred. Here, at least the actuating of the display device and the capturing and storing of the measuring data, preferably also the establishment of the display data, can be effected separately for each of the data sets. The portions of the method in which display data for actuating the display device are so established from the data sets that, upon actuation with the display data, the display device displays the processing types and the numbers of the value documents of the respective processing type that are to be fed, the display device is actuated with the display data, measuring data are respectively captured by means of the sensor device in accordance with the displayed processing types for a number of value documents fed to the value-document processing apparatus corresponding to the respective number, and the measuring data are stored, can thus in particular be so carried out that for each of the data sets the display data for the respective data set are established, the display device is actuated with the display data for the respective data set, and the measuring data for a number of value documents fed to the value-document processing apparatus corresponding to the number displayed for the data set are captured and preferably stored. Besides the display of the processing type for the value documents to be fed next and the corresponding number, there can also be displayed for example the processing types for which measuring data were already captured, and/or the processing types for which measuring data are yet to be captured; the display is then effected in such a manner that it is unambiguous which processing type is the current one or one to be processed.

Through the actuation of the display device with the display data, the display device displays the processing types and the respective number of the value documents or, for a data set, the processing type of the value documents to be fed to the apparatus next and the number of the value documents of the processing type. The user thereby obtains exact information about which value documents are to be fed to the apparatus next. This advantageously helps to avoid errors in the feed of value documents. In particular, it can increase the certainty that the fed value documents actually have the processing type for which their measuring data are stored.

The display of the processing type and of the corresponding number can be effected in principle arbitrarily, in particular in the two above-depicted variants, provided it is recognizable to a user which value documents he has to feed to the value-document processing apparatus how and in which number. For example, the processing type could be displayed by display of a corresponding text. However, it is preferred that the display data are so established that for displaying the respective processing type there is displayed an image of a value document corresponding to the processing type in the orientation corresponding to the processing type. In the apparatus, the control device can for this purpose preferably be further so configured that the display data are so established that for displaying the respective processing type there is displayed an image of a value document corresponding to the processing type in the orientation corresponding to the processing type. The image does not need to be very detailed here, but should let the value-document type and the orientation be unambiguously recognized.

The image data serving to define the displayed image can be stored in the value-document processing apparatus, associated with the respective value-document type and the orientation; the data set then only needs to contain a pointer thereto. Preferably, the read data set contains image data from which the control device so establishes the display data that for displaying the respective processing type there is displayed an image of a value document corresponding to the processing type in the orientation corresponding to the processing type.

Fed value documents are then transported to the sensor device, which captures measuring data therefor and preferably stores them.

Thus, there can be obtained a systematic and very reliable supplying of measuring data for value documents of stipulated processing types.

Within the context of the present invention, storing the measuring data is understood to be a storing in a memory device in which the measuring data are stored beyond the end of the method. The measuring data can be stored in principle arbitrarily. In a preferred variant, there can be associated with the measuring data, for a value document of a processing type, data characterizing the respective processing type, for example the corresponding processing-type data, and the measuring data can be stored together with the data. This makes it easy to identify which processing type the measuring data correspond to.

Additionally or alternatively, the measuring data can be stored, ordered according to the processing-type data. This allows fast access to the measuring data.

The measuring data can be stored in principle in arbitrary devices. According to a preferred variant, in the method, the measuring data can be stored in a memory device of the value-document processing apparatus. The apparatus can for this purpose preferably have a memory device for storing the captured measuring data or the control device can have a memory device for storing the captured measuring data. The captured measuring data can then be employed for adapting the classification parameters of the apparatus.

Alternatively or additionally, in the method, the measuring data can be transferred via the data interface or a further data interface and be stored in a set-off data processing apparatus or in an external memory. In the apparatus, the data interface and the control device can for this purpose preferably be so configured that data can be transferred via it to a set-off data processing apparatus or an external memory, or a further data interface can be provided and the control device so configured that data can be transferred via the further data interface to a set-off data processing apparatus or an external memory. The further data interface can comprise in particular an interface device of one type of the interface-device types previously mentioned for the data interface, but the data interface and the further data interface can have interface devices of the same or different type.

Preferably, in the second variant, in which the processing types of the value documents to be fed next are displayed in temporal succession, it is checked for a respective data set and/or processing type whether measuring data were captured for the number of value documents stipulated in the data set or for the processing type, and, if this is not the case, an error message is outputted, preferably displayed by means of the display device. Particularly preferably, this is respectively done after capture of the measuring data for the last value document fed for the respective data set or processing type. The last value document can be recognized in particular by checking whether no further value documents are present any longer to be fed to the transport path, in particular to a singling. In the apparatus, the control device can preferably be further configured such that it is checked for a respective data set and/or processing type whether measuring data were captured for the number of value documents stipulated in the data set or for the processing type, and, if this is not the case, an error message is outputted, preferably displayed by means of the display device. The apparatus can preferably have a sensor connected to the control device via a signal connection, by means of which it is establishable whether no further value documents are present any longer to be fed to the transport path, in particular to a singling. This embodiment has the great advantage that simple errors in the supplying of the value documents can be quickly recognized.

The following embodiment is independent of the previous variant, but can be combined therewith. According to this embodiment, in the method, upon or after the capture of the measuring data for value documents for a respective data set and/or processing type it is preferably checked while employing the measuring data whether the value documents corresponding to the data set or processing type have the processing type stipulated by the data set or the processing type according to a stipulated error criterion, or upon or after the capture of the measuring data for value documents for a respective data set and/or processing type it is checked while employing the measuring data whether the value documents corresponding to the data set or processing type have the value-document type stipulated by the data set and the orientation stipulated by the data set according to a stipulated error criterion, and, if this is not the case, the measuring data for value documents accordingly not having the respective processing type are not stored or deleted, and/or an error message is outputted, preferably displayed by means of the display device, for which purpose the control device forms corresponding display data and actuates the display device therewith. The error criterion is so chosen here that it is possible to distinguish the processing types at least in some features of the processing types, in particular the value-document type and preferably the orientation. A distinguishing according to all features of a processing type is advantageous, but does not need to be given.

The subject matter of the invention is further a computer program containing program code upon whose execution by means of a processor of a control device of a value-document processing apparatus which has a feeding device for value documents to be processed into which value documents are introducible and out of which they are outputtable in singled form, an output device in which processed value documents are depositable, a sensor device for capturing at least one property of value documents, a transport device for transporting value documents in singled form from the feeding device to the sensor device and from the sensor device to the output device, and a display device for displaying operator-control data, the method according to the invention is carried out. The control device is connected here to the sensor device, the transport device and the display device via signal connections.

Further subject matter of the invention is a data carrier on which a computer program according to the invention is stored.

BRIEF DESCRIPTION OF THE DRAWINGS

The invention will hereinafter be explained further by way of example with reference to the drawings. There are shown.

DETAILED DESCRIPTION OF VARIOUS EMBODIMENTS

Figure 1:
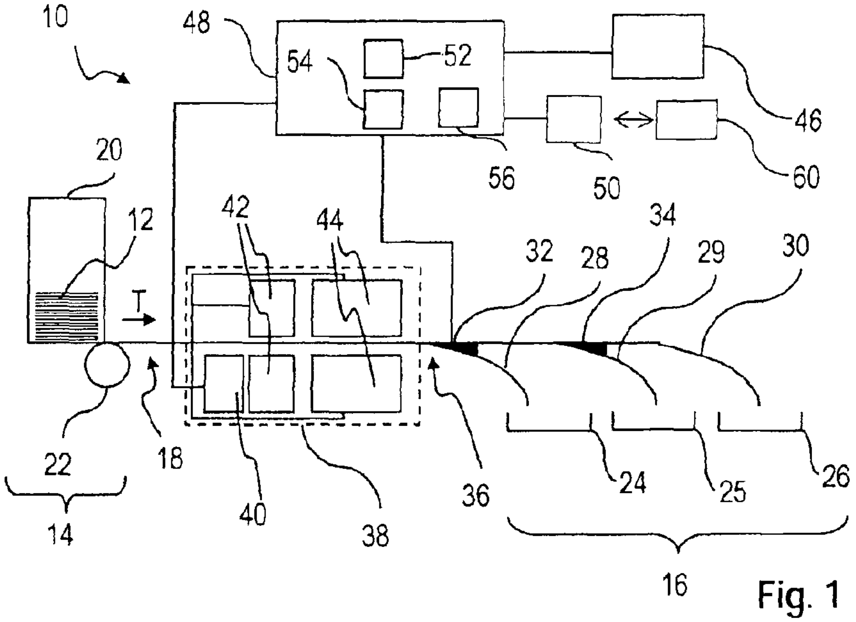
FIG. 1 a schematic view of a value-document processing apparatus in the form of a bank-note sorting apparatus, FIG. 2 views of a value document in the four possible orientations, FIGS. 3*a* and 3*b* views of displays on a display device of the apparatus in FIG. 1, FIG. 4 a simplified flowchart of a first embodiment of a method for supplying measuring data to be carried out by means of the apparatus in FIG. 1, FIG. 5 a simplified flowchart of a third embodiment of a method for supplying measuring data to be carried out by means of the apparatus in FIG. 1, and FIG. 6 a simplified flowchart of a third embodiment of a method for supplying measuring data to be carried out by means of the apparatus in FIG. 1

A value-document processing apparatus 10 in FIG. 1, in the example an apparatus for processing value documents 12 in the form of bank notes, is configured for sorting value documents in dependence on the recognition of the authenticity and the condition of processed value documents. The hereinafter described apparatus components are arranged in a housing (not shown) of the apparatus or held on said housing, unless they are designated as external.

The apparatus has a feeding device 14 for feeding value documents, an output device 16 for receiving processed, i.e. sorted, value documents, and a transport device 18 for transporting singled value documents from the feeding device 14 to the output device 16.

The feeding device 14 comprises in the example an input pocket 20 for a value-document stack and a singler 22 for singling value documents out of the value-document stack in the input pocket 20 and for feeding the singled value documents to the transport device 18.

The output device 16 comprises in the example three output portions 24, 25 and 26 into which processed value documents can be sorted, being sorted according to the result of the processing. In the example, each of the portions comprises a stack pocket and a stacking wheel (not shown) by means of which fed value documents can be deposited in the stack pocket.

The transport device 18 has at least two, in the example three, branches 28, 29 and 30 at whose ends the output portions 24, 25, 26 are respectively arranged and, at the branching points, gates 32 and 34, controllable by positioning signals, by means of which value documents are feedable to the branches 28 to 30 and thus to the output portions 24 to 26 in dependence on positioning signals.

On a transport path 36, defined by the transport device 18, between the feeding device 14, in the example more precisely the singler 22, and the first gate 32 after the singler 22 in the transport direction, is arranged a sensor device 38 which measures physical properties of value documents while the value documents are being transported past and forms sensor signals rendering the measuring results. In this example, the sensor device 38 has three sensors, namely, an optical remission sensor 40 which captures a remission color image and a remission IR image of the value document, an optical transmission sensor 42 which captures a transmission color image and a transmission IR image of the value document, and a transmission ultrasonic sensor 44 which captures or measures ultrasound transmission properties of the value document in a spatially resolved manner and will hereinafter only be designated as an ultrasonic sensor for simplicity's sake. The sensor signals formed by the sensors correspond to measuring data or raw data of the sensors which, depending on the sensor, may have already been subjected to a correction, for example in dependence on calibrating data and/or noise properties.

For capturing and displaying operator-control data, the value-document processing apparatus 10 has an input/output device 46 which comprises a display device. The input/output device 46 is realized in this example by a touch-sensitive display device ("touch screen"). In other exemplary embodiments it can comprise for example a keyboard and a display device, for example an LCD display.

A control and evaluation device 48 is connected via signal connections to the sensor device 38, the display device 46 and the transport device 18, in particular the gates 32 and 34. Further, a data interface 50 is connected to the control and evaluation device 48, by means of which the control and evaluation device 48 can read data sets from an external device. In the present example, the data interface 50 has a USB interface with a USB connection via which data can be read from an external USB storage medium 60 and/or be written thereto.

The value-document processing apparatus 10 is configured for being operated in two operating modes, a sorting mode for sorting value documents in dependence on their condition or quality and their authenticity, and a measuring-data capture mode for capturing measuring data for stipulated value documents. In particular, the control and evaluation device 48 is accordingly configured therefor.

In the sorting mode, value documents are singled out of the feeding device and transported past the sensor device 38 or therethrough. The sensor device 38 captures or measures physical properties of the value document respectively transported past or therethrough and forms sensor signals or measuring data which describe the measurement values for the physical properties. The control and evaluation device 48 classifies a value document into one of stipulated authenticity classes in dependence on the sensor signals of the sensor device 38 for the value document and on classification parameters stored in the evaluation device, and so actuates the transport device 18, here more precisely the gates 32, 34, by emitting positioning signals, that the value document is outputted in accordance with its class established upon the classification into an output portion of the output device 16 that is associated with said class. The association with one of the stipulated authenticity classes, or the classification, is effected here in dependence on at least one stipulated authenticity criterion.

In the measuring-data capture mode, value documents are singled out of the feeding device and transported past the sensor device 38 or therethrough. The sensor device 38 captures or measures physical properties of the value document respectively transported past or therethrough and forms sensor signals corresponding to measuring data which describe the measurement values for the physical properties. The control and evaluation device 48 captures the sensor signals and stores corresponding measuring data at least temporarily. After the capture the value documents are stacked in the output device 16, for example in the output portion 24.

The control and evaluation device 48 has for this purpose in particular—besides corresponding data interfaces (not shown in the figures) for the sensor device 38 or its sensors—a processor 52 and, connected to the processor 52, a memory 54 in which is stored at least one computer program with program code upon whose execution the processor 52 controls the apparatus in accordance with the operating mode. Thus, it can evaluate the sensor signals, in particular for establishing an authenticity class of a processed value document, and actuate the transport device 18 in accordance with the evaluation, or store the measuring data. The control and evaluation device 48 represents in particular a control device as intended by the invention. The value-document processing apparatus 10 further has a measuring-data memory 56 connected to the processor 52, which can be part of the control and evaluation device 48, as represented in FIG. 1, or be separate therefrom.

Further, the control and evaluation device 48 actuates the input/output device 46, inter alia, to display operator-control data, and thereby captures operator-control data which correspond to inputs of an operator.

Hereinafter will be described the aspects of the value-document processing apparatus 10 that concern in particular the measuring-data capture mode.

The computer program stored in the control and evaluation device 48 has in particular instructions for carrying out the hereinafter described method.

For adapting classification parameters which are employed upon the evaluation of sensor signals of the sensor device 38 or corresponding measuring data and/or upon the sorting of the value documents in dependence on the results of the evaluation of the sensor signals or corresponding measuring data, value documents of different value-document types and value-document properties are to be employed.

For this purpose, authentic value documents of stipulated value-document types and preferably also forgeries of said value-document types are stipulated, which are fed to the value-document processing apparatus 10 in order for the latter to capture and store sensor data for the value documents with its sensor device 38.

Figure 2:
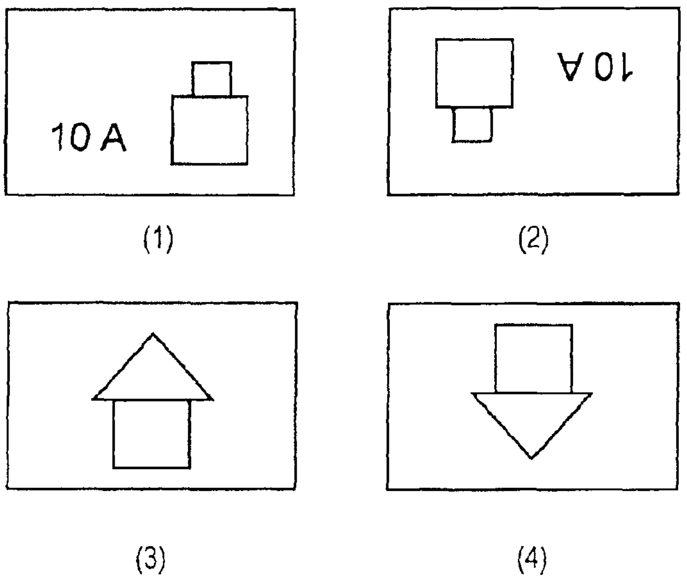

In this example there are stipulated as value-document types for simplicity's sake only bank notes of the currencies "A" and "B" respectively having nominal values of 10 and 20, which respectively bear on one side a first image specific to the nominal value and the currency and on the other side the nominal value and the currency symbol as well as a small second image. The side with the image will hereinafter be designated the image side and the side with the nominal value the numeral side. When the bank notes are unsorted, a bank note can be transported through the value-document processing apparatus in four different orientations which result from rotations by 90° in each case around axes parallel to the edges. The different orientations of a bank note of the currency "A" with a nominal value of 10 are shown by way of example in FIG. 2, in which the digits under the bank notes respectively identify the orientation. In the first two orientations the numeral side points upward, with the digits for representing the nominal value being readable, also designated as upright (cf. FIG. 2 (1)), or with the digits being upside down, the bank note thus being rotated by 180° around an axis orthogonally to the plane of the bank note (cf. FIG. 2 (2)). In the latter case, reference will hereinafter also be made to the reverse direction of the digits. The other two orientations result accordingly from the bank note being rotated by 180° relative to the first two orientations around an axis parallel to the transport direction or to the longitudinal edge of the bank note and in the plane of the bank note.

There is now written to an external USB data carrier or a USB storage medium 60 by means of an external computer a file which contains data sets which respectively contain, for at least two of the processing types, processing-type data by means of which the processing types can be distinguished and the number of the value documents of the stipulated processing type that are to be fed to the value-document processing apparatus.

The processing types are given here by the value-document types respectively in the four possible orientations in the transport path 36 or singler 22 and the authenticity. In the simple example, there thus result 32 different processing types when forgeries are also present for each of the value-document types.

The file now contains for each of the processing types a data set with processing-type data by means of which the processing types can be distinguished and the number of the value documents of the respective stipulated processing type that are to be fed to the value-document processing apparatus. The processing-type data enable in this example a distinction according to value-document type, in the example currency, value, authenticity and orientation of the value documents in a transport path or a singler of the value-document processing apparatus. More precisely, the data set contains in this order a character or character string for the currency, a character string for the nominal value, one of the numerals 1, 2, 3 and 4 which respectively describe the orientation, as well as a numeral 1 for authentic bank notes or 0 for forgeries. At the end there is a further numeral which states the number of the bank notes of the processing type that are to be fed to the value-document processing apparatus 10.

Each data set further contains image data which define an image of a value document of the processing type corresponding to the data set, in particular in the respective orientation. More precisely, each data set contains image data from which the control device so establishes the display data that for displaying the respective processing type an image of a value document corresponding to the processing type in the orientation corresponding to the processing type is displayed. In other exemplary embodiments, the data set can also instead contain a pointer to an image file which is likewise stored on the data carrier. In still other exemplary embodiments, the data set can also instead contain a pointer to an image file which is stored in the value-document processing device. In this example, the image data are a JPG image of a value document of the value-document type given by the data set or processing type, in the orientation given by the data set or processing type.

Figure 4:
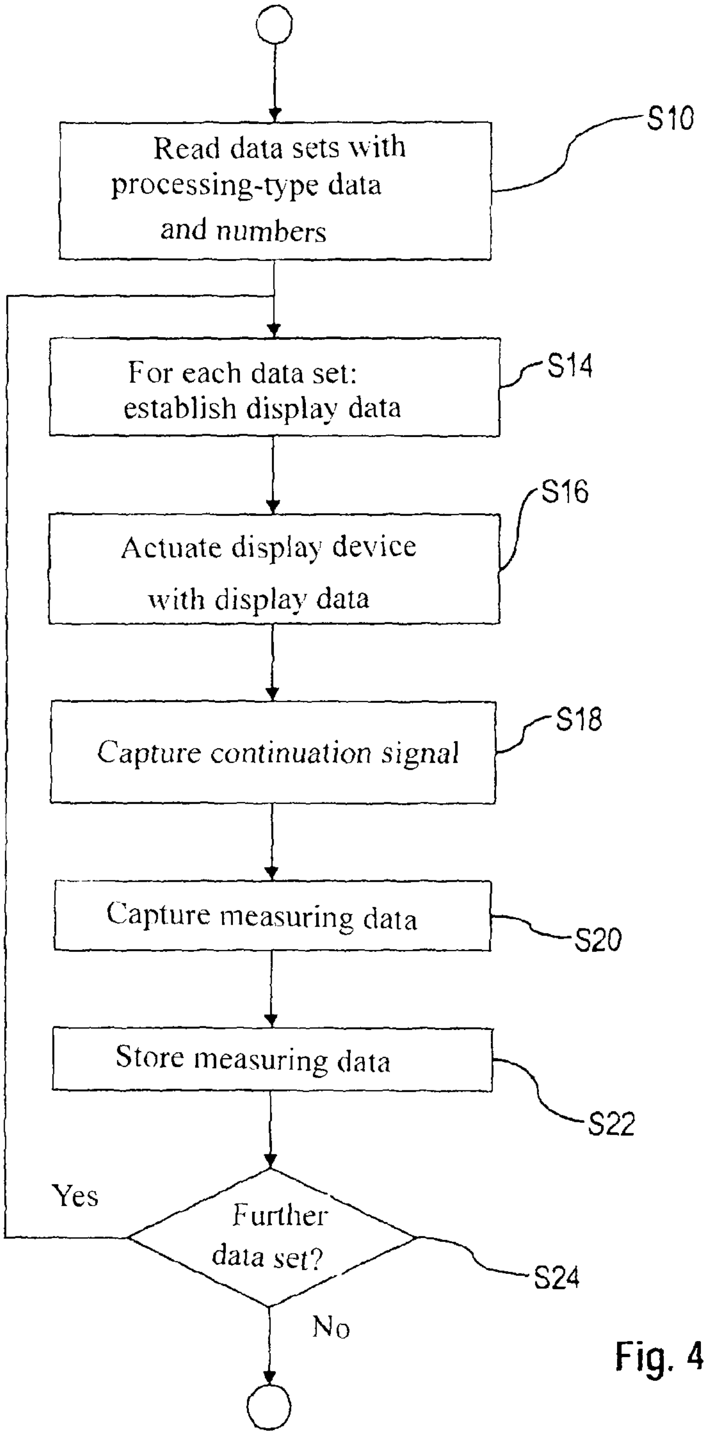

For supplying data for the adaptation of classification parameters of the value-document processing apparatus for processing value documents of the stipulated different processing types, there is now carried out the following method, illustrated schematically in FIG. 4, for supplying measuring data by means of the value-document processing device 10, here in particular the control and evaluation device 48, after the USB storage medium 60 in which the file is stored has been so connected to the data interface 50 that the control and evaluation device 48 can read the file.

A control command of an operator is captured by means of the input/output device 46, in the present example the touch-sensitive display device but in other exemplary embodiments via another input device, and transferred to the control and evaluation device 48. Upon the user's control command, the control and evaluation device 48 reads the file and therefrom the data sets from the data carrier 60 via the data interface 50 in step S10. The data sets contain for the stipulated processing types respectively the processing-type data by means of which the processing types can be distinguished and the number of the value documents of the stipulated processing type that are to be fed to the value-document processing apparatus.

For each of the data sets the following steps are then carried out:

From the processing-type data the control and evaluation device 48, in step S12, establishes display data for actuating the display device 46. Said display data are established by the control device, here the control and evaluation device 48, such that, upon actuation with the display data, the display device displays the processing types and the numbers of the value documents of the respective processing type that are to be fed. The display device is then actuated with said display data in step S16 and thereupon displays the processing type and the number of the value documents of the processing type that are to be fed for the processing type.

Figure 3A:
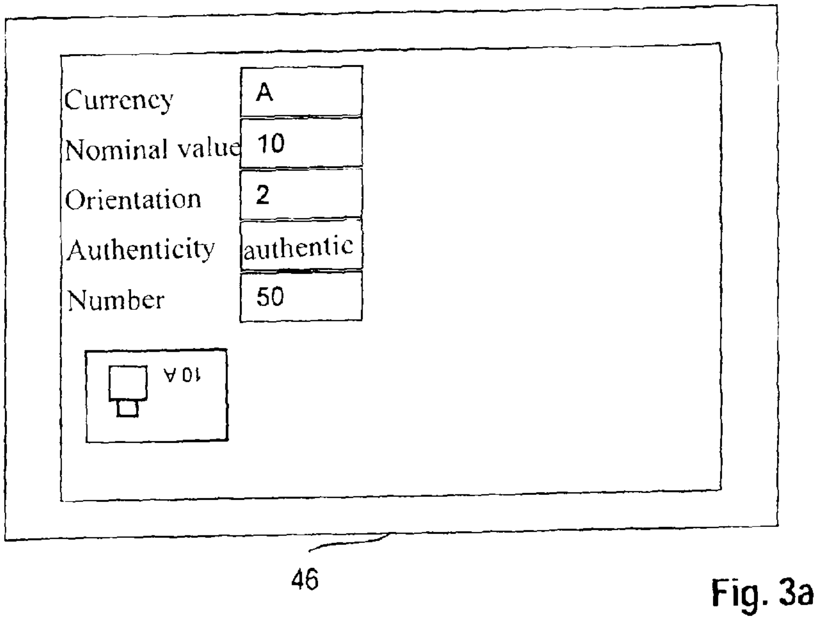
Figure 3B:
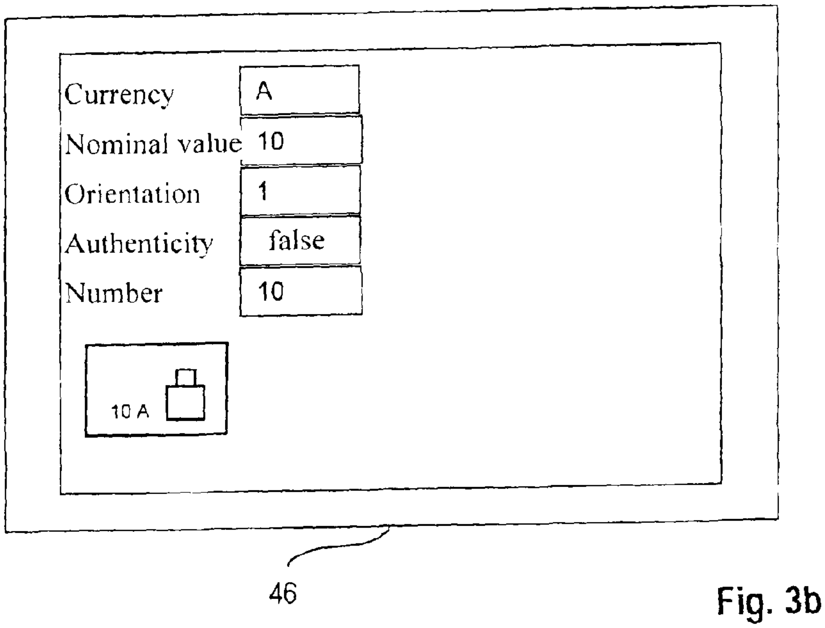

Two exemplary views of the display on the display device 46 for bank notes of the currency "A" and of the nominal value 10 are shown in FIG. 3*a* and FIG. 3*b*. The currency, the nominal value and the number are respectively displayed directly. The digit for representing the authenticity is converted to the character string "authentic" or "false", which is likewise displayed. Finally, there is displayed a bank-note image described by the image data for the processing type corresponding to the data set, in the orientation given in the data set.

For the data set to which the representation in FIG. 3*a* corresponds, it is thus displayed that fifty authentic bank notes of the currency "A" with a nominal value of 10 in the orientation 2 are now to be placed into the singler.

For the data set to which the representation in FIG. 3*b* corresponds, it is accordingly displayed that ten forged bank notes of the currency "A" with a nominal value of 10 in the orientation 1 are now to be placed into the singler.

The control and evaluation device 48 now waits for an input of the user by means of the display device 46, which displays that bank notes have been inserted into the feeding device 14, more precisely the singler 22.

The user places the number, stipulated by the display, of value documents of the processing type stipulated by the display into the feeding device 14.

The user's input by means of the display device 46 triggers a continuation signal. Alternatively, in other exemplary embodiments the insertion of a new value-document stack can also be recognized by a corresponding sensor in or on the singler, and a corresponding continuation signal be formed.

Upon the continuation signal in step S18, the control and evaluation device 48 actuates the singler 22 which singles the value documents and feeds them to the transport path.

In step S20, measuring data are captured by means of the sensors for the value documents fed to the value-document processing apparatus 10, and in step S22 stored in the control and evaluation device 48. The measuring data are stored more precisely in a memory device of the value-document processing apparatus, here the measuring-data memory 56, for example a hard disk, permanently, i.e. at least beyond the end of processing of the value documents for the read data sets.

In so doing, data characterizing the processing type are respectively associated with the measuring data. If the processing types are consecutively numbered, for example, the corresponding number can be associated with the measuring data for each of the value documents.

These steps are carried out successively for the different processing types given by the data sets in the file. In step S24 it is respectively established whether a further data set is present and, if this is the case, step S14 is performed for the next data set, while otherwise the method is ended.

The measuring data are stored, ordered according to the processing types or processing-type data.

The measuring data can then be employed for adapting the parameters on the value-document processing apparatus.

A second exemplary embodiment differs from the first exemplary embodiment in that the measuring data, after intermediate storage in the measuring-data memory 56, are transferred via the data interface 50 to the USB storage medium 60, and stored there, after processing of all data sets.

The thus obtained measuring data can be transferred by connection of the USB storage medium to an external data processing device to the latter and be employed there for adapting the classification parameters.

Figure 5:
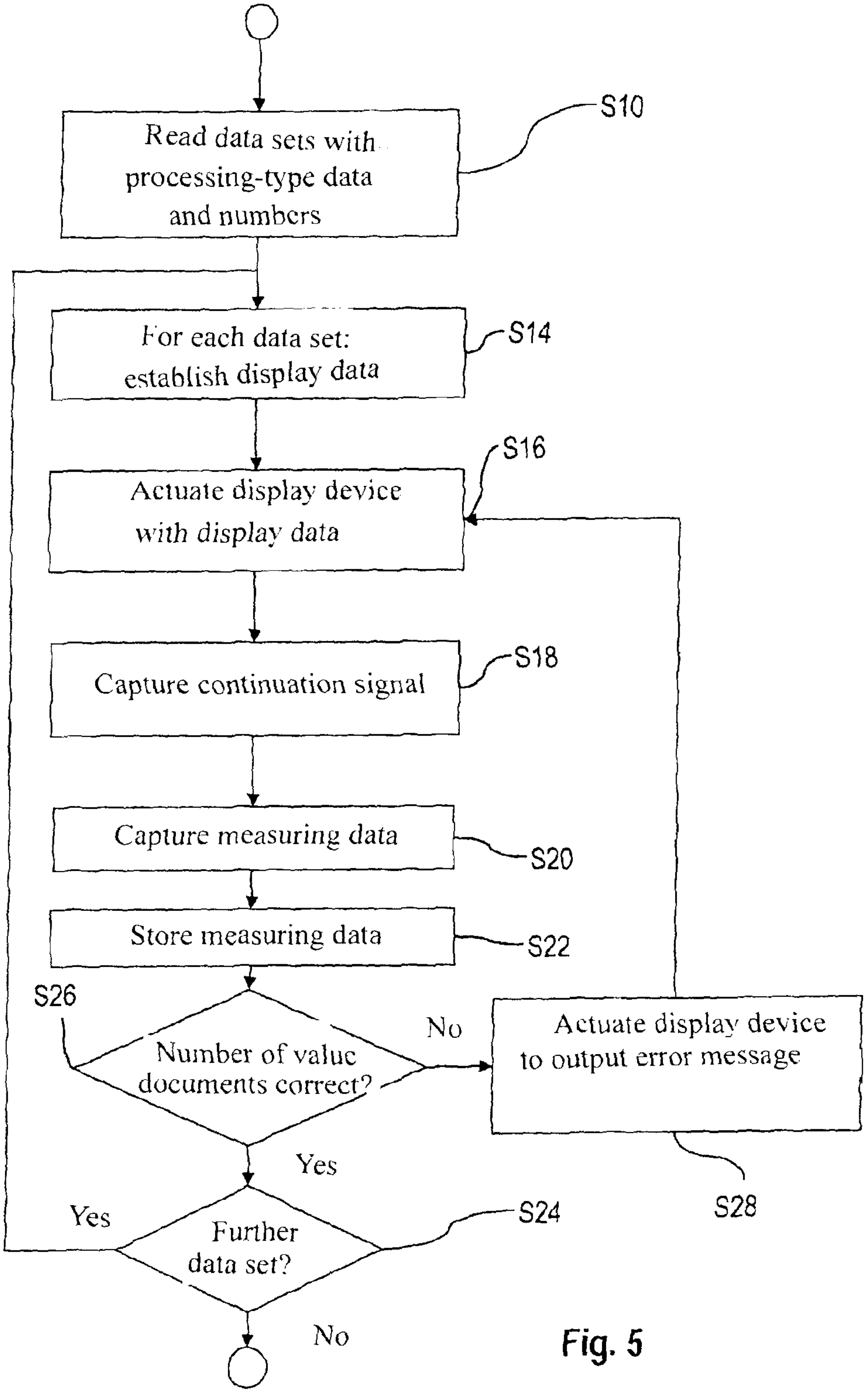

A third exemplary embodiment illustrated in FIG. 5 differs from the first exemplary embodiment only in that it is checked whether the value documents respectively fed to the value-document processing apparatus, in this exemplary embodiment after formation of the continuation signal, were actually fed in the number respectively stated by the data sets. If this is not the case, a corresponding reaction of the apparatus is effected.

In this method, as in the first exemplary embodiment, the capture of the measuring data is ended in step S20 when all value documents in the feeding device have been singled and measuring data captured therefor.

The measuring data are stored as in the first exemplary embodiment in step S22.

In a step S26, however, the control and evaluation device 48 checks whether the number of the value documents for which measuring data were captured for the respective data set equals the number of value documents to be fed as stipulated by the respective data set. If this is the case, the method is continued as in the first exemplary embodiment.

Otherwise, the control and evaluation device 48 so actuates the display device 46 with display data that it displays an error message. The error message states which error has occurred, how many value documents were to be fed, and how many value documents were actually fed.

The control and evaluation device then captures a confirmation input via the display device 46 (in other exemplary embodiments another input device) and continues the method with step S16, in which the processing type and the number of the value documents to be fed are shown again.

In step S16 the measuring data already present for the data set are deleted.

Figure 6:
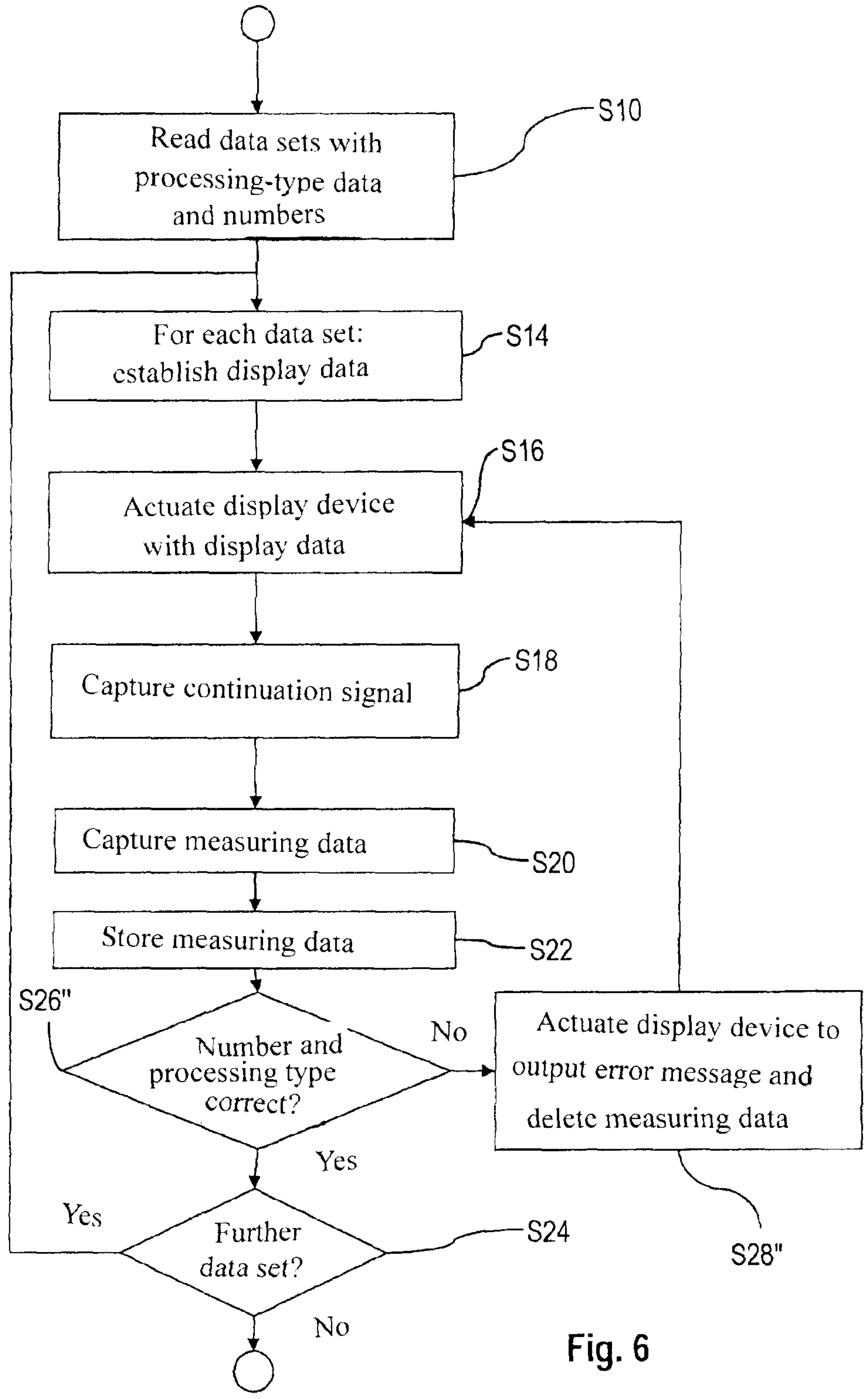

A fourth exemplary embodiment, partly illustrated in FIG. 6, differs from the first exemplary embodiment in that it is checked whether the value documents fed to the value-document processing apparatus actually have the processing types and numbers stated by the data sets. If this is not the case, a corresponding reaction of the apparatus is effected.

For this purpose, the value-document processing apparatus has an evaluation of the sensor data that permits at least a recognition of whether a captured value document has the respectively stipulated processing type according to a stipulated error criterion. In the present example, a value document has a processing type according to the error criterion when it has the value-document type corresponding to the processing type and the orientation corresponding to the processing type. More precisely, there are stored in the control and evaluation device for this purpose program code for a corresponding evaluation method and parameters to be employed upon the execution of the program code and thus of the evaluation method, which permit a corresponding classification in a stipulated tolerance range.

After the unchanged execution of steps S20 and S22, i.e. after the capture of the measuring data for value documents for the respective data set and thus processing type, it is checked in a step S26" while employing the measuring data whether the value documents corresponding to the data set or processing type have the processing type stipulated by the data set or the processing type according to the stipulated error criterion. In the present case, this means that it is checked whether the value documents corresponding to the data set or processing type have the value-document type stipulated by the data set and the orientation stipulated by the data set, according to a stipulated error criterion.

If this is the case, the method is continued with step S24.

Otherwise, in step S28" the measuring data for all value documents fed for the respective data set, in particular the value documents not having the respective processing type, are deleted. Further, an error message is outputted, for which purpose the control and evaluation device 48 here so actuates the display device that the error message is displayed. The error message contains information about which value documents did not have the processing type, for example by stating the position in the fed stack.

The method is then continued with step S16, in which it is again displayed which value documents are to be fed.

Another exemplary embodiment differs from the preceding exemplary embodiment in that the check as to whether a value document has the value-document type stipulated by the respective data set is effected immediately after the capture of the measuring data, and the corresponding measuring data are not stored. The output of the error message is effected after the capture of the measuring data for all value documents for the respective data set.

A further exemplary embodiment differs from the fourth exemplary embodiment only in that through corresponding configuration of the control and evaluation device, in a step otherwise corresponding to step S28", only measuring data for those value documents are deleted that do not correspond to the processing type respectively given by the data set.

Further exemplary embodiments differ from the third and fourth exemplary embodiments in that the method is terminated after step S28 or S28".

Further exemplary embodiments differ from the above-described exemplary embodiments in that the stipulated value documents comprise different quality, for example value documents that are fit for circulation and ones that are no longer fit for circulation. The number of the processing types then doubles, since the processing types now also differ by the property “quality”. The processing-type data then comprise another digit which describes the quality.

Further exemplary embodiments differ from the above-described exemplary embodiments in that the data interface 50 comprises, instead of the USB interface or in addition thereto, a reader for flash memory cards or a network card or a FireWire or Thunderbolt interface with software for connection to a data network or an external memory device. The software of the control and evaluation device is then adapted accordingly to read the data sets by means of the data interface. The stated data can then be read from a flash memory card or by means of the network card via a data network connected thereto or via the FireWire or Thunderbolt interface.

Further exemplary embodiments differ from the above-described exemplary embodiments in that the image files for the stipulated processing types are stored in the memory 52 of the control and evaluation device 48 and hence do not need to be read in.

Still further exemplary embodiments differ from the above-described exemplary embodiments in that the data sets are already stored in a memory of the value-document processing device and are read from the memory. The data interface 50 is then unnecessary. This exemplary embodiment allows for example to already store the data sets upon delivery or installation of the value-document processing apparatus, so that no further data carrier is necessary.

Still further exemplary embodiments differ from the above-described exemplary embodiments in that the control and evaluation device is so configured that after the reading of all data sets it so establishes display data from the data sets that upon actuation of the display device with the actuating data the processing types and the respective numbers of the value documents to be fed are displayed simultaneously, i.e. in one view, in the order of the data sets. The control and evaluation device is further configured such that a stack, located in the feeding device, of value documents separated by separating elements, for example separation cards, header cards or the like, is fed to the sensor device, which captures the measuring data for the value documents. The user then only needs to insert a stack of value documents which has the value documents of the processing type stipulated by the respective data set and of the number stipulated by the respective data set and which is separated by the separating elements, in the order of the data sets, which is preferably formed by said value documents and separating elements.

Still further exemplary embodiments differ from the above-described exemplary embodiments in that parts of the control and evaluation device 48 and of the software are integrated into the sensors of the sensor device.

Still further exemplary embodiments differ from the above-described exemplary embodiments in that there is provided a further data interface connected to the control and evaluation device, by means of which captured measuring data are transferable to an external data memory device connected to the data interface and are storable there. As a data interface there can be employed in particular a USB, FireWire or Thunderbolt interface or a network interface, for example one of the various available Ethernet interfaces.

Other exemplary embodiments differ from the above-depicted exemplary embodiments in that the processing-type data are also stored, associated with the measuring data for a data set.

Further exemplary embodiments differ from the above-described exemplary embodiments in that the output device has additional output portions, and the transport device additional gates. The control device is then configured such that value documents are stored in accordance with their value-document type and/or the established authenticity and/or the established quality.

The invention claimed is:

1. A method for processing value documents of stipulated different processing types with a value document processing apparatus, the value-document processing apparatus including a feeding device, a sensor device for capturing at least one property of value documents transported in the value-document processing apparatus, a transport device for transporting the value documents in singled form from the feeding device to the sensor device, a control device connected to the sensor device, a display device actuated by the control device, and an output device in which processed value documents are deposited, the method comprising the following steps in sequence:

reading data sets which respectively contain, for at least two of the processing types, processing-type data by means of which the processing types can be distinguished and a quantity of the value documents of the respective processing type that are to be fed to the value-document processing apparatus can be determined, establishing display data for actuating the display device from the data sets;

displaying with the display device, upon actuation with the display data, the processing types and the quantities of the value documents of at least two processing types that are to be fed into the feeding device, the display device being actuated with the display data;

receiving with the feeding device the value documents to be processed, the feeding device outputting the value documents in singled form;

transporting the value documents, by the transport device, from the feeding device to the sensor device;

in accordance with each of the displayed stipulated processing types, capturing measuring data by the sensor device for a quantity of value documents transported in the value-document processing apparatus, said measuring data representing the at least one property, said quantity corresponding to the displayed quantity of value documents of the respective processing type;

storing the measuring data; and outputting the value documents from the feeding device in singled form, wherein in the step of storing the measuring data, the measuring data are stored for a period of time beyond completion of the steps of reading the data sets, establishing the display data, displaying, receiving value documents, transporting, capturing measuring data, and outputting the value documents.

2. The method according to claim 1, wherein the processing-type data enable a distinction according to at least two or more of value-document type, quality, authenticity, and orientation of the value documents in a transport path or a feeding device of the value-document processing apparatus.

3. The method according to claim 1, wherein the data sets are read by means of a data interface of the value-document processing apparatus.

4. The method according to claim 1, wherein the data sets are stored in a memory of the value-document processing device and read from the memory.

5. The method according to claim 1, wherein at least the actuating of the display device and the capturing and storing the measuring data are effected separately for each of the data sets.

6. The method according to claim 1, wherein the display data are so established that for displaying the respective processing type an image of a value document corresponding to the processing type, in the orientation corresponding to the processing type, is displayed.

7. The method according to claim 1, wherein there are associated with the measuring data, for a value document of a processing type, data characterizing the respective processing type, for example the corresponding processing-type data, and the measuring data are stored together with the data and/or wherein the measuring data are stored, ordered according to the processing-type data.

8. The method according to claim 1, wherein the measuring data are transferred via the data interface or a further data interface and stored in a set-off data processing apparatus or in an external memory.

9. The method according to claim 1, wherein the measuring data are stored in a memory device of the value-document processing apparatus.

10. The method according to claim 1, wherein after capture of the measuring data for a respective data set and/or processing type it is checked whether measuring data were captured for the quantity of value documents stipulated in the data set or for the processing type, and, if this is not the case, an error message is outputted and displayed by the display device.

11. The method according to claim 1, wherein upon or after the capture of the measuring data for value documents for a respective data set and/or processing type it is checked while employing the measuring data whether the value documents corresponding to the data set or processing type have the processing type stipulated by the data set or the processing type according to a stipulated error criterion, or upon or after the capture of the measuring data for value documents for a respective data set and/or processing type it is checked while employing the measuring data whether the value documents corresponding to the data set or processing type have the value-document type stipulated by the data set and the orientation stipulated by the data set, according to a stipulated error criterion, and, if this not the case, the measuring data for value documents not having the respective processing type are not stored or deleted, and/or an error message is outputted and displayed by the display device.

12. An apparatus for processing value documents of stipulated different processing types, said apparatus comprising:

a reading device that reads data sets which respectively contain, for at least two of the processing types, processing-type data by which the processing types can be distinguished and a quantity of the value documents of the respective processing type that are to be fed to the value-document processing apparatus, a feeding device for value documents to be processed into which value documents are introducible and out of which the value documents are output in singled form, an output device in which processed value documents are deposited, a sensor device for capturing at least one property of value documents, a control device connected via signal connections to the sensor device, the control device configured to establish display data for actuating the display device from the data sets a transport device for transporting value documents in singled form from the feeding device to the sensor device and from the sensor device to the output device, a display device that displays, upon actuation with the display data established by the control device, the processing types and the quantity of the value documents of at least two processing types that are to be fed into the feeding device, the display device being actuated with the display data, a storage device, and an output device that outputs the value documents from the feeding device in singled form, wherein, in accordance with each of the displayed processing types, the sensor device captures measuring data for a quantity of value documents transported in the value-document processing apparatus, said measuring data representing the at least one property, said quantity corresponding to the displayed quantity of value documents of the respective processing type, and wherein the storage device stores the measuring data, the measuring data are stored for a period of time beyond completion of the steps of reading the data sets, establishing the display data, displaying, receiving value documents, transporting, capturing measuring data, and outputting the value documents.

13. The apparatus according to claim 12, which further has a data interface which, for transferring data to the control device, is connected to the latter, and wherein the control device is configured for reading the data sets by means of the data interface.

14. The apparatus according to claim 12, wherein a memory device is provided in which the data sets are stored, or the control device has a memory device for storing the data sets, in which the data sets are stored.

15. The apparatus according to claim 12, wherein the control device is further so configured that at least the actuating of the display device and the capturing and storing of the measuring data are effected separately for each of the data sets.

16. The apparatus according to claim 12, wherein the control device is further so configured that the display data are so established that for displaying the respective processing type an image of the value document in the respective orientation is displayed.

17. The apparatus according to claim 12, wherein there are associated with the measuring data, for a value document of a processing type, data characterizing the respective processing type, for example the corresponding processing-type data, and the measuring data are stored together with the data and/or the measuring data are stored, ordered according to the processing-type data.

18. The apparatus according to claim 12, wherein the data interface and the control device are so configured that data can be transferred via it to a set-off data processing apparatus or an external memory, or wherein a further data interface is provided and the control device is so configured that data can be transferred via the further data interface to a set-off data processing apparatus or an external memory.

19. The apparatus according to claim 12, which has a memory device for storing the captured measuring data or wherein the control device has a memory device for storing the captured measuring data.

20. The apparatus according to claim 12, wherein the control device is further configured such that it is checked for a respective data set and/or processing type whether measuring data were captured for the quantity of value documents stipulated in the data set or for the processing type, and, if this is not the case, an error message is outputted and displayed by the display device.

21. The apparatus according to claim 12, wherein the control device is further configured such that upon or after the capture of the measuring data for value documents for a respective data set and/or processing type it is checked while employing the measuring data whether the value documents corresponding to the data set or processing type have the processing type stipulated by the data set or the processing type according to a stipulated error criterion, or upon or after the capture of the measuring data for value documents for a respective data set and/or processing type it is checked while employing the measuring data whether the value documents corresponding to the data set or processing type have the value-document type stipulated by the data set and the orientation stipulated by the data set, according to a stipulated error criterion, and, if this not the case, the measuring data for value documents not having the processing properties are not stored or deleted, and/or an error message is outputted and displayed by the display device.

22. A non-transitory computer-readable medium having stored thereon executable instructions that, when executed by one or more processors of a control device of a value-document processing apparatus, configure the value-document processing apparatus to perform the following steps in sequence, wherein the value-document processing apparatus includes a feeding device for value documents to be processed into which value documents are introducible and out of which they are output in singled form, an output device in which processed value documents are depositable, a sensor device for capturing at least one property of value documents, a transport device for transporting value documents in singled form from the feeding device to the sensor device and from the sensor device to the output device, and a display device for displaying operator-control data:

reading data sets which respectively contain, for at least two of the processing types, processing-type data by means of which the processing types can be distinguished and a quantity of the value documents of the respective processing type that are to be fed to the value-document processing apparatus, establishing display data for actuating the display device from the data sets;

displaying with the display device, upon actuation with the display data, the processing types and the quantities of the value documents of at least two processing type that are to be fed into the feeding device, the display device being actuated with the display data;

in accordance with each of the displayed stipulated processing types, capturing measuring data by the sensor device for a quantity of value documents transported in the value-document processing apparatus, said measuring data representing the at least one property, said quantity corresponding to the displayed quantity of value documents of the respective processing type;

storing the measuring data; and outputting the value documents from the feeding device in singled form, wherein in the step of storing the measuring data, the measuring data are stored for a period of time beyond completion of the steps of reading the data sets, establishing the display data, displaying, receiving value documents, transporting, capturing measuring data, and outputting the value documents.

23. The non-transitory computer-readable medium according to claim 22, wherein the non-transitory computer-readable medium is a non-transitory data carrier.

* * * * *